(12) United States Patent
Song (10) Patent No.: US 6,768,393 B2
(45) Date of Patent: Jul. 27, 2004

(54) CIRCUIT AND METHOD FOR CALIBRATING RESISTORS FOR ACTIVE TERMINATION RESISTANCE, AND MEMORY CHIP HAVING THE CIRCUIT

(75) Inventor: Ho-Young Song, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 84 days.

(21) Appl. No.: 10/271,455

(22) Filed: Oct. 16, 2002

(65) Prior Publication Data

US 2003/0117147 A1 Jun. 26, 2003

(30) Foreign Application Priority Data

Dec. 22, 2001 (KR) ........................................ 2001-83343

(51) Int. Cl.[7] .............................................. H03H 11/00
(52) U.S. Cl. ..................... 333/22 R; 333/213; 324/601; 326/30; 326/32; 327/108; 330/260; 365/189.12
(58) Field of Search ............................. 326/30, 32, 86; 327/108; 333/22 R, 213; 330/260; 324/601

(56) References Cited

U.S. PATENT DOCUMENTS

| | | | | |
|---|---|---|---|---|
| 5,617,064 A | * | 4/1997 | Gorecki | .................... 333/22 R |
| 5,666,087 A | * | 9/1997 | Gorecki | ....................... 330/260 |
| 6,448,815 B1 | * | 9/2002 | Talbot et al. | .................. 326/86 |
| 6,566,904 B2 | * | 5/2003 | van Bavel et al. | ............ 326/30 |
| 6,590,413 B1 | * | 7/2003 | Yang | ............................ 326/30 |

* cited by examiner

Primary Examiner—Vibol Tan
(74) Attorney, Agent, or Firm—F. Chau & Associates, LLC (57) ABSTRACT

A circuit and method for calibrating an active termination resistor irrespective of changes in process, voltage, or temperature is provided. The method includes the steps of (a) calibrating a first variable resistor to have the same resistance as that of an external resistor; (b) at the same time calibrating a second variable resistor to have the same resistance as that of the first variable resistor; and (c) calibrating the active termination resistor to have the same resistance as that of the external resistor. The step of calibrating the first variable resistor to have the same resistance as that of the external resistor is in response to a first control code, and at the same time the step of calibrating the second variable resistor to have the same resistance as that of the first variable resistor is in response to a second control code. The first control code is generated to correspond to a comparison value in resistance of the first variable resistor with the external resistor, and the second control code is generated to correspond to a comparison value in resistance of the first variable resistor with the second variable resistor. During step (a), the resistance of the first variable resistor and the resistance of the second variable resistor increase or decrease at the same time.

17 Claims, 5 Drawing Sheets

CIRCUIT AND METHOD FOR CALIBRATING RESISTORS FOR ACTIVE TERMINATION RESISTANCE, AND MEMORY CHIP HAVING THE CIRCUIT

CROSS REFERENCE TO RELATED APPLICATIONS

This application claims the benefit of priority of Korean Patent Application No. 01-83343 filed on Dec. 22, 2001, the disclosures of which are hereby incorporated by reference for all purposes as if fully set forth herein.

BACKGROUND OF THE INVENTION

1. Field of the Invention

The present invention relates to bus termination in a memory system, and more particularly, to a circuit and method for calibrating resistors to have the same resistance as that of an external resistor irrespective of changes in process, voltage, or temperature.

2. Discussion of Related Art

In general, a bus of a memory system is terminated using stub bus terminated logic (SSTL) or active termination. The active termination is also called 'on-chip termination' and terminates a bus of a memory system using an active termination resistor in a chip (hereinafter, referred to as 'termination resistor'). The active termination is advantageous in that it has better signal integrity and facilitates operation of the memory system at higher data rate than SSTL.

The key point of the active termination depends on how precisely the termination resistor can be calibrated for termination resistance. In the prior art, an analog control voltage is used as a control signal to calibrate the termination resistor. However, since the control voltage is sensitive to noise, it is difficult to precisely calibrate the termination resistor with the control voltage, and further, the signal transfer characteristics of a bus may deteriorate.

Conventionally, the active termination is performed using two chips in common (hereinafter, referred to as 'x2') or four chips in common (hereinafter, referred to as 'x4'). However, in both cases, at least another circuit is further required for calibrating the termination resistor (as compared to the active termination using one chip). Thus, in the conventional active terminations, the overhead of the circuit layout as well as power consumption increases markedly.

SUMMARY OF THE INVENTION

A circuit and method is provided for calibrating an active termination resistor irrespective of changes in process, voltage or temperature, and a memory device including such a circuit.

An embodiment of the present invention provides a method of reducing power consumption and the overhead of the circuit layout, and a memory device for performing the method.

There is also provided a method of calibrating an active termination resistor, the method including the steps of (a) calibrating a first variable resistor to have the same resistance as that of an external resistor, and at the same time calibrating a second variable resistor to have the same resistance as that of the first variable resistor; and (b) calibrating the active termination resistor to have the same resistance as that of the external resistor.

Here, step (a) includes calibrating the first variable resistor to have the same resistance as that of the external resistor in response to a first control code, and at the same time calibrating the second variable resistor to have the same resistance as that of the first variable resistor in response to a second control code.

The first control code is generated to correspond to a comparison value in resistance of the first variable resistor with the external resistor, and the second control code is generated to correspond to a comparison value in resistance of the first variable resistor with the second variable resistor During step (a), the resistance of the first variable resistor and the resistance of the second variable resistor increase or decrease at the same time.

There is also provided a circuit for calibrating an active termination resistor to have the same resistance as that of an external resistor, the circuit including a first control circuit for comparing voltage at a first node, to which the external resistor is connected, with a reference voltage, and for outputting a first control code for controlling a first variable resistor that supplies electric current to the first node; and a second control circuit for comparing voltage at a second node, to which a second variable resistor is connected, with voltage at the first node, and for outputting a second control code for controlling a dummy variable resistor that supplies electric current to the second node and is the same as the first variable resistor, wherein the resistance of the first variable resistor and the resistance of the dummy variable resistor are calibrated in response to the first control code, and at the same time the second variable resistor is calibrated to have the same resistance as that of the external resistor in response to the second control code, and the active termination resistor is calibrated to have the same resistance as that of the external resistor in response to the first control code and/or the second control code.

According to another aspect of the invention, there is provided a circuit for calibrating an active termination resistor to have the same resistance as that of an external resistor, the circuit including a first node to which the external resistor and a first variable resistor are connected; a first control code generation circuit for comparing voltage at the first node with a reference voltage, and for outputting a first control code corresponding to a comparison result; a second node to which a dummy variable resistor, which is the same as the first variable resistor, and a second variable resistor are connected; and a second control code generation circuit for comparing voltage at the first node with voltage at the second node, and for outputting a second control code corresponding to the comparison result, wherein the first variable resistor and the dummy variable resistor are calibrated in response to the first control code, and at the same time the second variable resistor is calibrated to have the same resistance as that of the external resistor in response to the second control code, and the active termination resistor is calibrated to have the same resistance as that of the external resistor in response to the first control code and/or the second control code.

Preferably, the resistance of the first variable resistor and the resistance of the second variable resistor increase or decrease at the same time. Also, preferably, voltage at the first node is generated in response to electric current flowing through the first variable resistor, and voltage at the second node is generated in response to electric current flowing through the dummy variable resistor.

There is further provided a memory device including a calibrating circuit for outputting first and second control codes; a shifter block for multiplexing the first and second control codes in response to a selection signal, and for outputting control codes controlling an active termination resistor; and variable resistor units for calibrating the active termination resistor to have the same resistance as that of an external resistor connected to the calibrating circuit in response to the control codes.

Here, the calibrating circuit includes a first node connected to the external resistor and a first variable resistor; a first control code generation circuit for comparing voltage at the first node and a reference voltage, and for outputting the first control code corresponding to a comparison result; a second node connected to a dummy variable resistor, which is the same as the first variable resistor, and a second variable resistor; and a second control code generation circuit for comparing voltage at the first node with voltage at the second node, and for outputting the second control code corresponding to the comparison result, wherein the first variable resistor and the dummy variable resistor are calibrated to have the same resistance as that of the external resistor in response to the first control code, and at the same time the second variable resistor is calibrated to have the same resistance as that of the external resistor in response to the second control code.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF PREFERRED EMBODIMENTS

Figure 1:
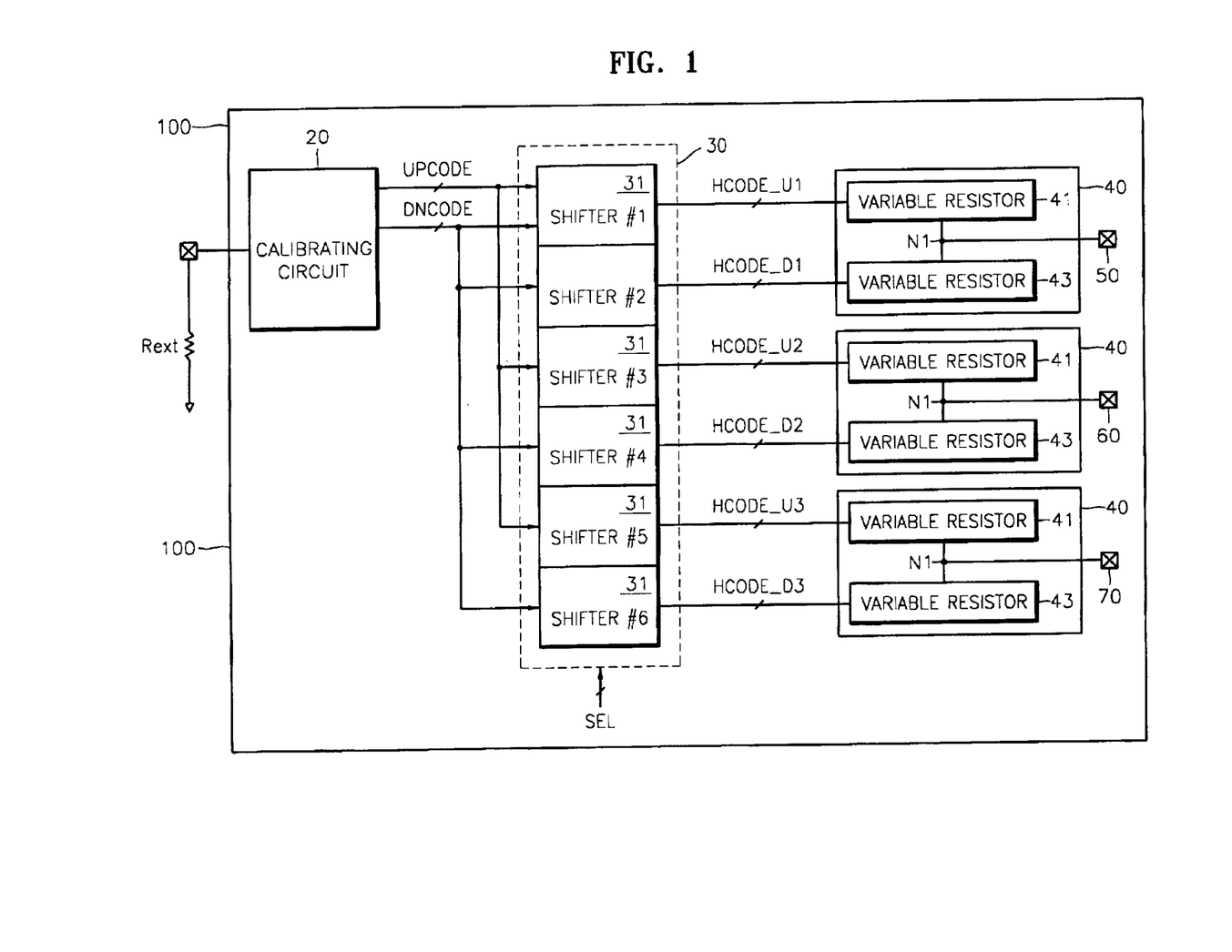
FIG. 1 is a schematic block diagram of a memory device having a calibrating circuit according to an embodiment of the present invention.

FIG. 1 is a schematic block diagram of a memory device having a circuit for calibrating an active termination resistor. Referring to FIG. 1, a chip 100 includes a circuit 20 for calibrating the active termination resistor (hereinafter, referred to as 'calibrating circuit'), a shifter block 30, a plurality of variable resistor units 40, and a plurality of pads 50, 60, and 70. The calibrating circuit 20 is connected to an external resistor Rext via a pad 10.

The calibrating circuit 20 outputs a first control code UPCODE and a second control code DNCODE to the shifter block 30. Preferably, the first and second control codes UPCODE and DNCODE consist of N bits.

The shifter block 30 is composed of a plurality of shifters 31, and outputs control codes HCODE_Ui and HCODE_Di for controlling the plurality of variable resistor units 40 of x1, x2, or x4 in response to a selection signal SEL. Here, i is an integer from 1 to 3. The control codes HCODE_Ui and HCODE_Di are also composed of N bits.

Therefore, the shifters 31 can shift the first and second control codes UPCODE/DNCODE one or more times, and generate termination resistance for x2 or x4.

Each of the plurality of variable resistor units 40 includes first and second variable resistors 41 and 43, and is calibrated to correspond to resistance of the external resistor Rext. The pad 50 is a pad for outputting data, the pad 60 is a pad for a clock signal, and the pad 70 is a pad for an address/command signal. Each of the pads 50, 60 and 70 is connected to a node N1 of each of the variable resistor units 40.

Figure 2:
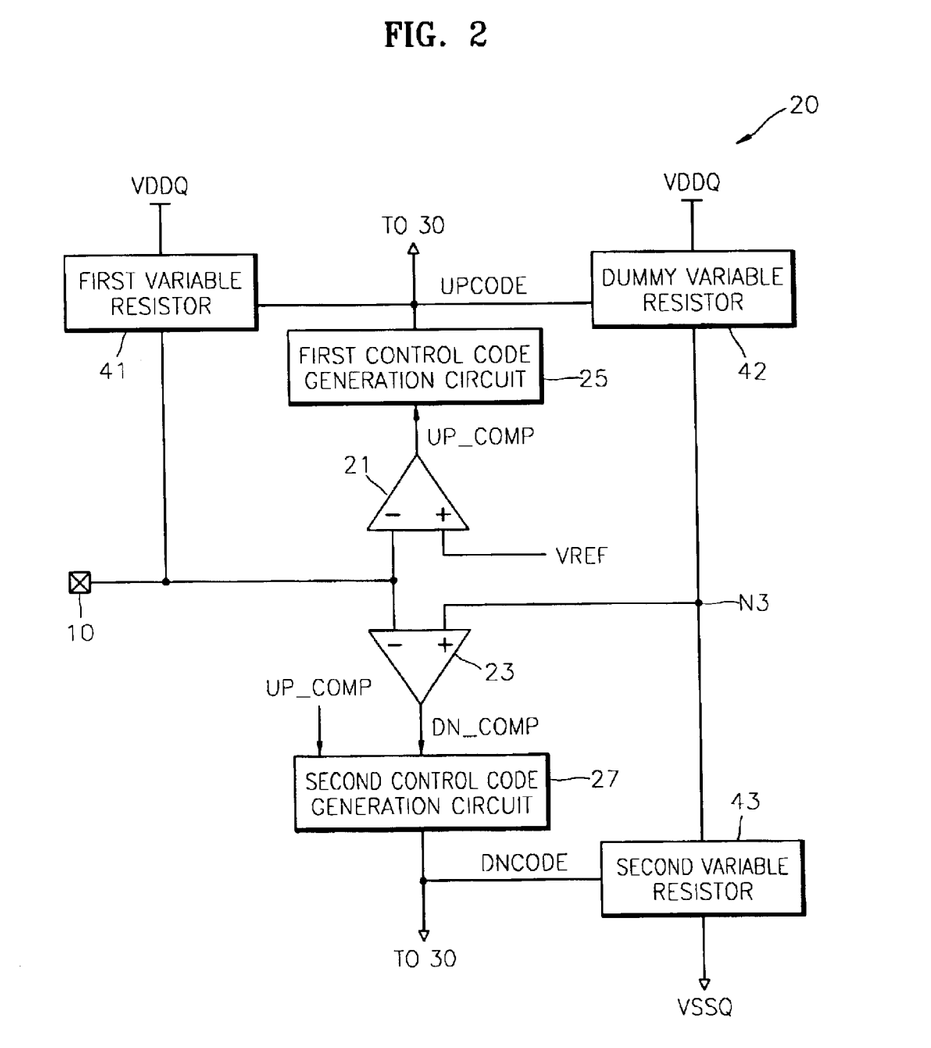
FIG. 2 is a circuit diagram of a calibrating circuit according to an embodiment of the present invention.

FIG. 2 is a circuit diagram of a calibrating circuit 20 according to an exemplary embodiment of the present invention. Referring to FIG. 2, the calibrating circuit 20 includes a first variable resistor 41, a dummy variable resistor 42, a second variable resistor 43, first and second comparison circuits 21 and 23, a first control code generation circuit 25, and a second control code generation circuit 27.

Figure 5:
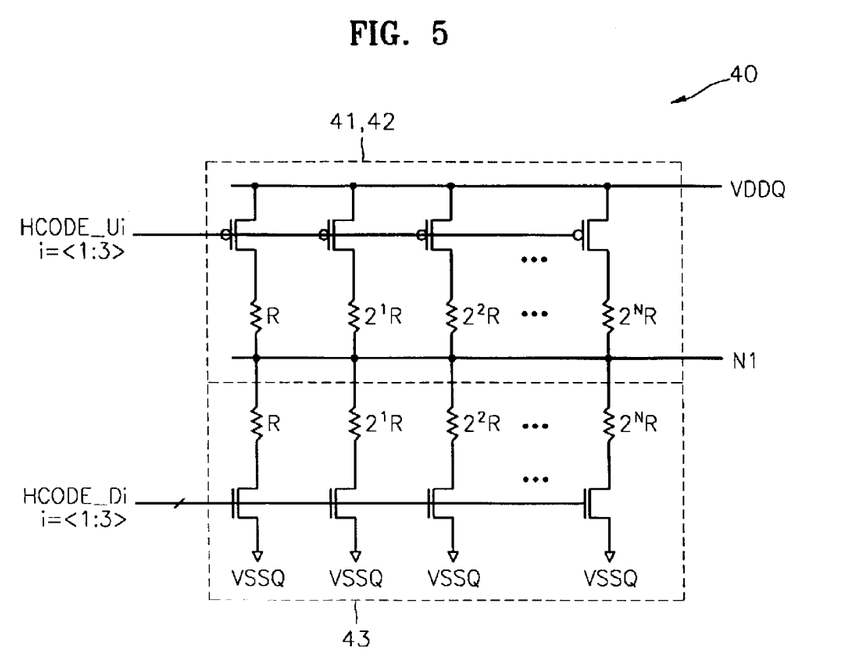
FIG. 5 is a circuit diagram of the variable resistor unit of FIG. 1.

The first variable resistor 41 is connected between a first power source VDDQ and the pad 10; the dummy variable resistor 42 is connected between the first power source VDDQ and a node N3; and the second variable resistor 43 is connected between the node N3 and a second power source VSSQ. The structure and operations of the dummy variable resistor 42 are the same as those of the first variable resistor 41. The structures of the dummy variable resistor 42 and the second variable resistor 43 are symmetrical with each other, and their operations are the same as shown in FIG. 5.

The first comparison circuit 21 compares a reference voltage VREF with voltage at the pad 10, and outputs a first comparison signal UP_COMP, which corresponds to the comparison result, to the first control code generation circuit 25. Voltage at the pad 10 changes by the electric current flowing through the first variable resistor 41.

The second comparison circuit 23 compares voltage at the node N3 with voltage at the pad 10, and outputs a second comparison signal DN_COMP, which corresponds to the comparison result, to the second control code generation circuit 27. Voltage at the node N3 changes by electric current flowing through the dummy variable resistor 42. Here, preferably, the reference voltage VREF and voltage at the node N3 are respectively 0.5 VDDQ.

The first control code generation circuit 25 outputs the first control code UPCODE to the first variable resistor 41, to the dummy variable resistor 42, and to the shifter block 30 in response to the first comparison signal UP_COMP. The reference voltage VREF and voltage at the pad 10 become the same in the event that the first variable resistor 41 and the dummy variable resistor 42 are calibrated to have the same resistance as that of the external resistor Rext in response to the first control code UPCODE. The first control code generation circuit 25 is made of a general up/down counter, and thus a detailed description thereof will be omitted.

The second control code generation circuit 27 outputs the second control code DNCODE to the second variable resistor 43 and the shifter block 30 in response to the first and second comparison signals UP_COMP and DN_COMP. If the second variable resistor 43 is calibrated to have the same resistance as that of the dummy variable resistor 42 in response to the second control code DNCODE, voltage at the node N3 and voltage at the pad 10 become the same.

Figure 3:
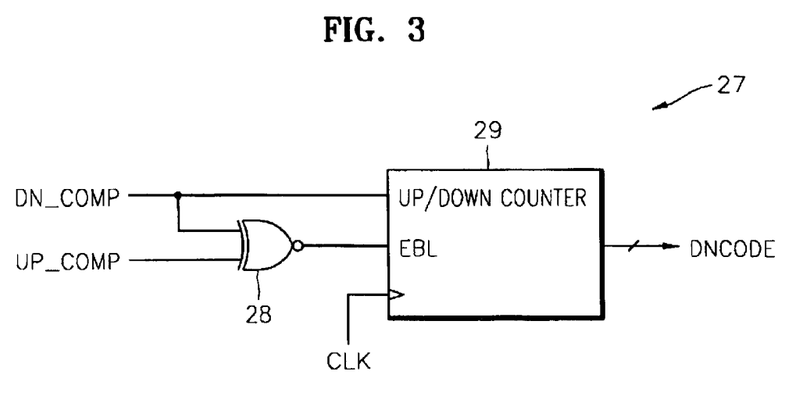
FIG. 3 is a block diagram of a second control code generation circuit of FIG. 2.

FIG. 3 is a block diagram of the second control code generation circuit in FIG. 2. Referring to FIG. 3, the second control code generation circuit 27 includes a logic gate 28 and an up/down counter 29. The logic gate 28 is an exclusive-NOR circuit, and the up/down counter 29 is enabled in response to a signal output from the logic gate 28. In other words, the up/down counter 29 is enabled in response to the first and second comparison signals UP_COMP and DN_COMP of first or second state, which reduces quantization errors made by digital calibration.

Hereinafter, a case where the first and second variable resistors 41 and 43 are calibrated to have the same resistance as that of the external resistor Rext, will be described with reference to FIGS. 1 through 3.

First, voltage at the pad 10 is generated by electric current flowing through the first variable resistor 41. If voltage at the pad 10 is greater than the reference voltage VREF, i.e., the resistance of the first variable resistor 41 is smaller than that of the external resistor Rext, the comparison circuit 21 outputs the first comparison signal UP_COMP of the first state, and the first control code generation circuit 25, which is made of a general up/down counter, is down-counted in response to the first comparison signal UP_COMP of the first state (low). As a result, the first control code UPCODE is reduced.

Therefore, the resistance of the first variable resistor 41 and the resistance of the dummy variable resistor 42 increase in response to the first control code UPCODE. This is repeated until voltage at the pad 10 becomes identical to the reference voltage VREF. As a result, the first variable resistor 41 and the dummy variable resistor 42 are calibrated to have the same resistance as that of the external resistor Rext.

Meanwhile, if voltage at the pad 10 is smaller than the reference voltage VREF, i.e., the resistance of the first variable resistor 41 is larger than that of the external resistor Rext, the first comparison circuit 21 outputs the first comparison signal UP_COMP of the second state (high), and the first control code generation circuit 25 is up-counted in response to the first comparison signal UP_COMOP. As a result, the first control code UPCODE is increased.

Thus, the resistance of the first variable resistor 41 and the resistance of the dummy variable resistor 42 decrease in response to the first control code UPCODE. This is repeated until voltage at the pad 10 is identical to the reference voltage VREF. As a result, the first variable resistor 41 and the dummy variable resistor 42 are calibrated to have the same resistance as that of the external resistor Rext.

Then, voltage at the node N3 is generated by electric current flowing through the dummy variable resistor 42. The second comparison circuit 23 outputs the second comparison signal DN_COMP of the first state (low) in the event that voltage at the pad 10 is larger than voltage at the node N3, i.e., the resistance of the second variable resistor 41 is smaller than that of the first variable resistor 41 or the resistance of the dummy variable resistor 42.

The second control code generation circuit 27 responds to the first comparison signal UP_COMP of the first state and the second comparison signal DN_COMP of the first state, and outputs the down-counted second control code DNCODE to the second variable resistor 43. As a result, the resistance of the second variable resistor 43 increases in response to the second control code DNCODE until it is identical with the resistance of the dummy variable resistor 42.

When voltage at the pad 10 is smaller than voltage at the node N3, i.e., the resistance of the second variable resistor 41 is larger than that of the dummy variable resistor 42, the second comparison circuit 23 outputs the second comparison signal DN_COMP of the second state. The second control code generation circuit 27 responds to the first comparison signal UP_COMP of the second state (high) and the second comparison signal DN_COMP of the second state, and outputs the up-counted second control code DNCODE to the second variable resistor 43. Therefore, the resistance of the second variable resistor 43 decreases in the second control code DNCODE until it becomes identical with the resistance of the dummy variable resistor 42.

The calibrating circuit 20 performs the above operations to increase or decrease resistance of the variable resistors 41, 42 and 43 irrespective of changes in process, voltage, or temperature. Thus, the variable resistors 41, 42 and 43 can be calibrated to have the same resistance as that of the external resistor Rext. Also, in the event that there is an offset between the comparison circuits 21 and 23, voltage at the pad 10 can be made to be the same as voltage at the node N3 and the reference voltage VREF by the operation of the calibrating circuit 20.

That is, the calibrating circuit 20 according to an embodiment of the present invention can compensate for the variation of the termination voltage due to the offset between the comparison circuits 21 and 23. Accordingly, even if a memory device having the calibrating circuit 20 operates at high speed, its timing margin can be increased.

Figure 4:
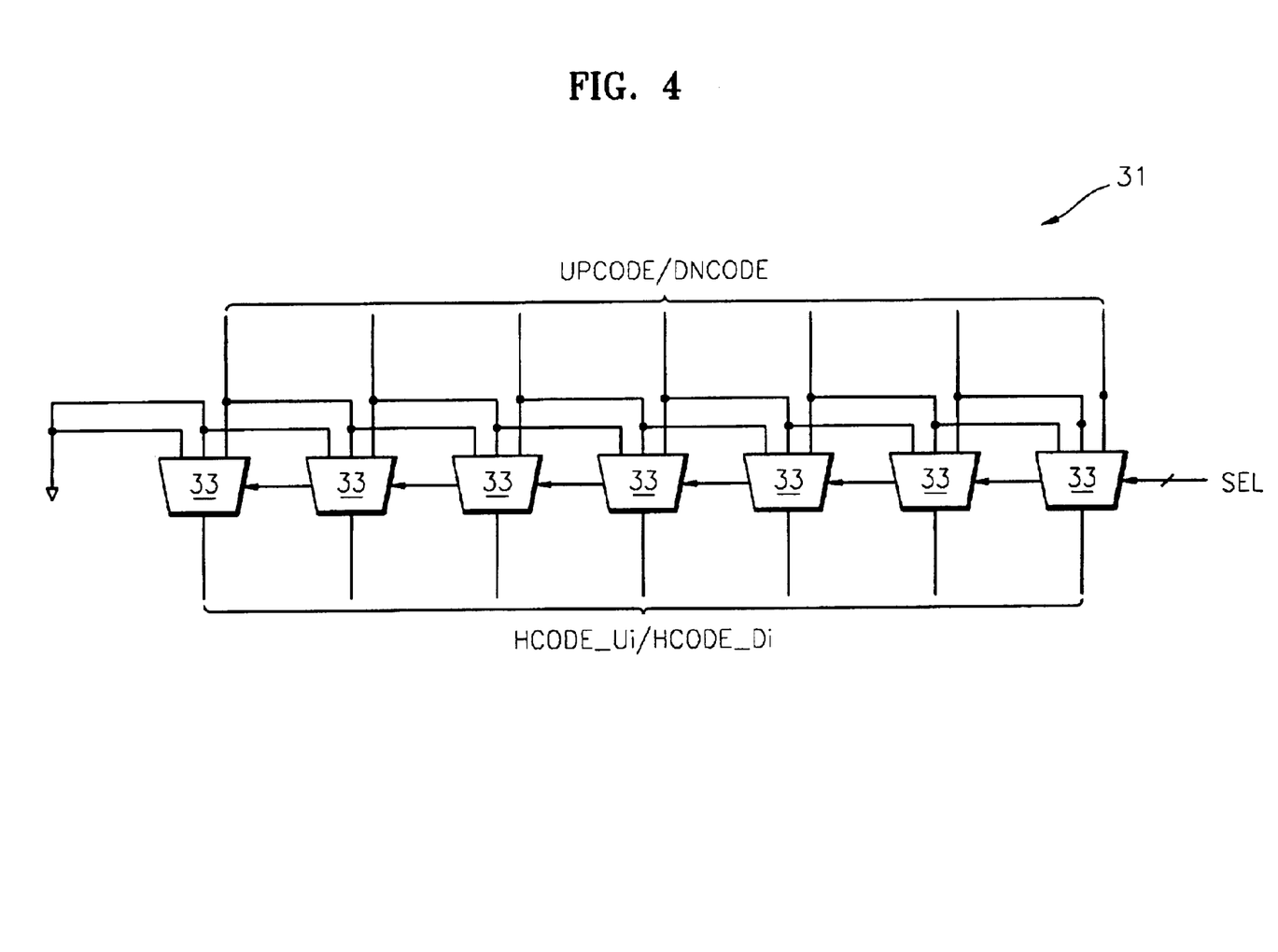
FIG. 4 is a circuit diagram of the shifter of FIG. 1.

FIG. 4 is a circuit diagram of the shifter 31 of FIG. 1. Referring to FIG. 4, the shifter 31 includes a plurality of multiplexers 33. The multiplexers 33 multiplex first and second codes UPCODE/DNCODE in response to a selection signal of N bits, and outputs control codes HCODE_Ui and HCODE_Di for controlling resistors of x1, x2, or x4 (i is an integer from 1 to 3).

If the active termination is performed using two chips in common, i.e., x2, shifters #3 and #4 output control codes HCODE_U2/HCODE_D2 corresponding to the first and second control codes UPCODE/DNCODE in response to a selection signal SEL, wherein shifters #5 and #6 output control codes HCODE_U3/HCODE_D3, which are made by shifting once the first and second control codes UPCODE/DNCODE, in response to the selection signal SEL.

FIG. 5 is a circuit diagram of the variable resistance unit of FIG. 1. The first variable resistor 41 and the dummy variable resistor 42 include a plurality of PMOS transistors and a plurality of resistors R, $2^1 R$, ..., and $2^N R$. Each transistor is connected with the plurality of resistors R, $2^1 R$, ..., and $2^N R$ in series. The control codes HCODE_Ui and HCODE_Di are binary weighted codes, and are inputted to gates of their corresponding transistors (i is an integer from 1 to 3). Each of the resistors R, $2^1 R$, ..., and $2^N R$ has a weighted resistance as shown in FIG. 5.

The first variable resistor 41 and the dummy variable resistor 42 respectively have a different resistance in response to the control codes HCODE_Ui and HCODE_Di. That is, each of resistance of x1, resistance of x2, and resistance of x4 is different from one another.

The second variable resistor 43 includes a plurality of NMOS transistors and a plurality of resistors R, $2^1 R$, ..., and $2^N R$. Each of the NMOS transistors is connected with the resistors R, $2^1 R$, ..., and $2^N R$ in series. The control codes HCODE_Di and HCODE_Di are binary weighted codes, and are inputted to gates of their corresponding transistors. Each resistor has a weighted resistance as shown in FIG. 5.

The chip 100 according to an embodiment of the present invention shifts the first and second control codes UPCODE/DNCODE using one calibrating circuit 20 and the shifters 31 so as to generate termination resistance for x2 or x4 at the same time. Thus, the consumption of power and the overhead of the circuit layout can be reduced by incorporating the chip 100.

As described above, each resistor can be calibrated to have the same resistance as that of an external resistor irrespective of changes in process, voltage or temperature using a calibrating circuit and method according to the present invention. Also, it is possible to increase the noise immunity, and easily control the termination of a bus of a memory system.

Further, quantization errors due to digital control of a memory device can be reduced using a calibrating circuit and method to calibrate resistors for termination resistance according to the present invention. In addition, a memory device according to the present invention is capable of reducing the consumption of power as well as the overhead area of the circuit layout, and increasing the timing margin when operating a memory device at high speed.

While the present invention has been particularly shown and described with reference to preferred embodiments thereof, this invention is not restricted to the above embodiments. Further, it will be understood by those skilled in the art that various changes in form and details may be made without departing from the spirit and scope of the invention as defined by the appended claims.

What is claimed is:

1. A method of calibrating an active termination resistor, the method comprising:
   (a) calibrating a first variable resistor to have the same resistance as that of an external resistor;
   (b) calibrating a second variable resistor to have the same resistance as that of the first variable resistor; and
   (c) calibrating the active termination resistor to have the same resistance as that of the external resistor.

2. The method of claim 1, wherein calibrating the first variable resistor is in response to a first control code, and calibrating the second variable resistor is in response to a second control code.

3. The method of claim 2, wherein the first control code is generated to correspond to a comparison value in resistance of the first variable resistor with the external resistor, and the second control code is generated to correspond to a comparison value in resistance of the first variable resistor with the second variable resistor.

4. The method of claim 1, wherein during steps (a) and (b), resistance of the first variable resistor and resistance of the second variable resistor increase or decrease at the same time.

5. A method of calibrating an active termination resistor, the method comprising:
   comparing voltage at a pad, to which an external resistor is connected, with a reference voltage, and outputting a first comparison signal corresponding to the comparison result;
   calibrating a first variable resistor to have the same resistance as that of the external resistor in response to the first comparison signal until voltage at the pad is identical with the reference voltage;
   comparing voltage at the pad and voltage at a second variable resistor, and outputting a second comparison signal corresponding to a comparison result;
   calibrating the second variable resistor to have the same resistance as that of the external resistor in response to the second comparison signal; and
   calibrating the active termination resistor to have the same resistance as that of the first variable resistor and/or the second variable resistor.

6. The method of claim 5, wherein voltage at the pad is generated by electric current passing by the first variable resistor.

7. The method of claim 5, wherein voltage at the second variable resistor is generated by electric current flowing through a dummy variable resistor having the same resistance as the first variable resistor.

8. The method of claim 5, wherein the resistance of the first variable resistor and the resistance of the second variable resistor increase or decrease at the same time.

9. A circuit for calibrating an active termination resistor to have the same resistance as that of an external resistor, the circuit comprising:
   a first control circuit for comparing voltage at a first node, to which the external resistor is connected, with a reference voltage, and for outputting a first control code controlling a first variable resistor that supplies electric current to the first node; and
   a second control circuit for comparing voltage at a second node, to which a second variable resistor is connected, with voltage at the first node, and for outputting a second control code controlling a dummy variable resistor that supplies electric current to the second node and is the same as the first variable resistor,
   wherein the first variable resistor and the dummy variable resistor are calibrated in response to the first control code, and at the same time the second variable resistor is calibrated to have the same resistance as that of the external resistor in response to the second control code, and
   the active termination resistor is calibrated to have the same resistance as that of the external resistor in response to the first control code and/or the second control code.

10. The circuit of claim 9, wherein the resistance of the first variable resistor and the resistance of the second variable resistor increase or decrease at the same time.

11. The circuit of claim 9, wherein voltage at the first node is generated in response to electric current flowing through the first variable resistor, and voltage at the second node is generated in response to electric current flowing through the dummy variable resistor.

12. A circuit for calibrating an active termination resistor to have the same resistance as that of an external resistor, the circuit comprising:
   a first node to which the external resistor and a first variable resistor are connected;
   a first control code generation circuit for comparing voltage at the first node with a reference voltage, and for outputting a first control code corresponding to the comparison result;
   a second node to which a dummy variable resistor, which has the same resistance as that of the first variable resistor, and a second variable resistor are connected; and
   a second control code generation circuit for comparing voltage at the first node with voltage at the second node, and for outputting a second control code corresponding to the comparison result,
   wherein the first variable resistor and the dummy variable resistor are calibrated in response to the first control code, and at the same time the second variable resistor is calibrated to have the same resistance as that of the external resistor in response to the second control code, and
   the active termination resistor is calibrated to have the same resistance as that of the external resistor in response to the first control code and/or the second control code.

13. The circuit of claim 12, wherein the resistance of the first variable resistor and the resistance of the second variable resistor increase or decrease at the same time.

14. The circuit of claim 12, wherein voltage at the first node is generated in response to electric current flowing through the first variable resistor, and voltage at the second node is generated in response to electric current flowing through the dummy variable resistor.

15. A memory device comprising:
a calibrating circuit for outputting first and second control codes;
a shifter block for multiplexing the first and second control codes in response to a selection signal, and for outputting control codes controlling an active termination resistor; and
variable resistor units for calibrating the active termination resistor to have the same resistance as that of an external resistor connected to the calibrating circuit in response to the control codes,
wherein the calibrating circuit comprises:
a first node connected to the external resistor and a first variable resistor;
a first control code generation circuit for comparing voltage at the first node and a reference voltage, and for outputting the first control code corresponding to the comparison result;
a second node connected to a dummy variable resistor, which is the same as the first variable resistor, and a second variable resistor; and
a second control code generation circuit for comparing voltage of the first node and voltage at the second node, and for outputting the second control code corresponding to the comparison result,
wherein the first variable resistor and the dummy variable resistor are calibrated to have the same resistance as that of the external resistor in response to the first control code, and at the same time the second variable resistor is calibrated to have the same resistance as that of the external resistor in response to the second control code.

16. The memory device of claim 15, wherein the resistance of the first variable resistor and the resistance of the second variable resistor increase or decrease at the same time.

17. The memory device of claim 15, wherein voltage at the first node is generated by electric current flowing through the first variable resistor, and voltage at the second node is generated in response to electric current flowing through the dummy variable resistor.

* * * * *